Fig. 9.
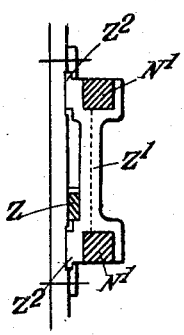
Fig. 10.
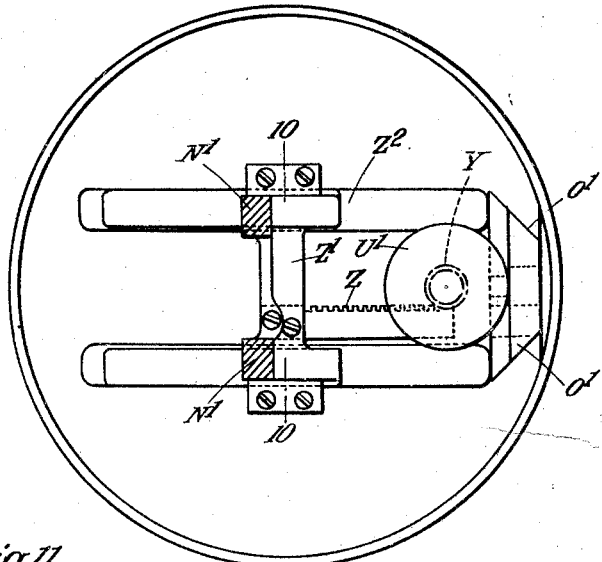
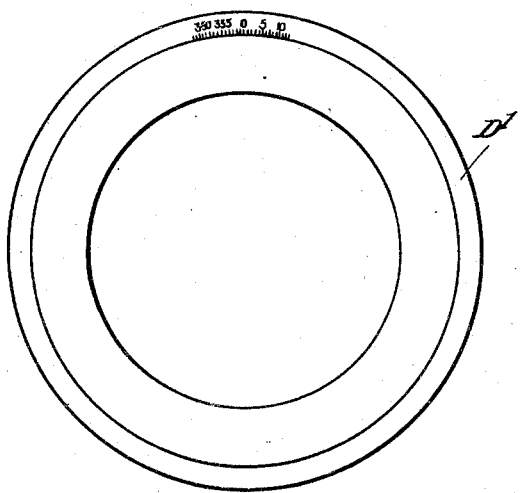
Fig. 11.
Fig. 12.
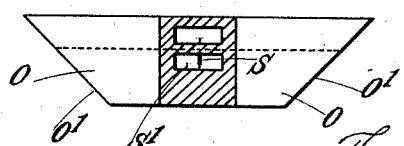
Fig. 13.

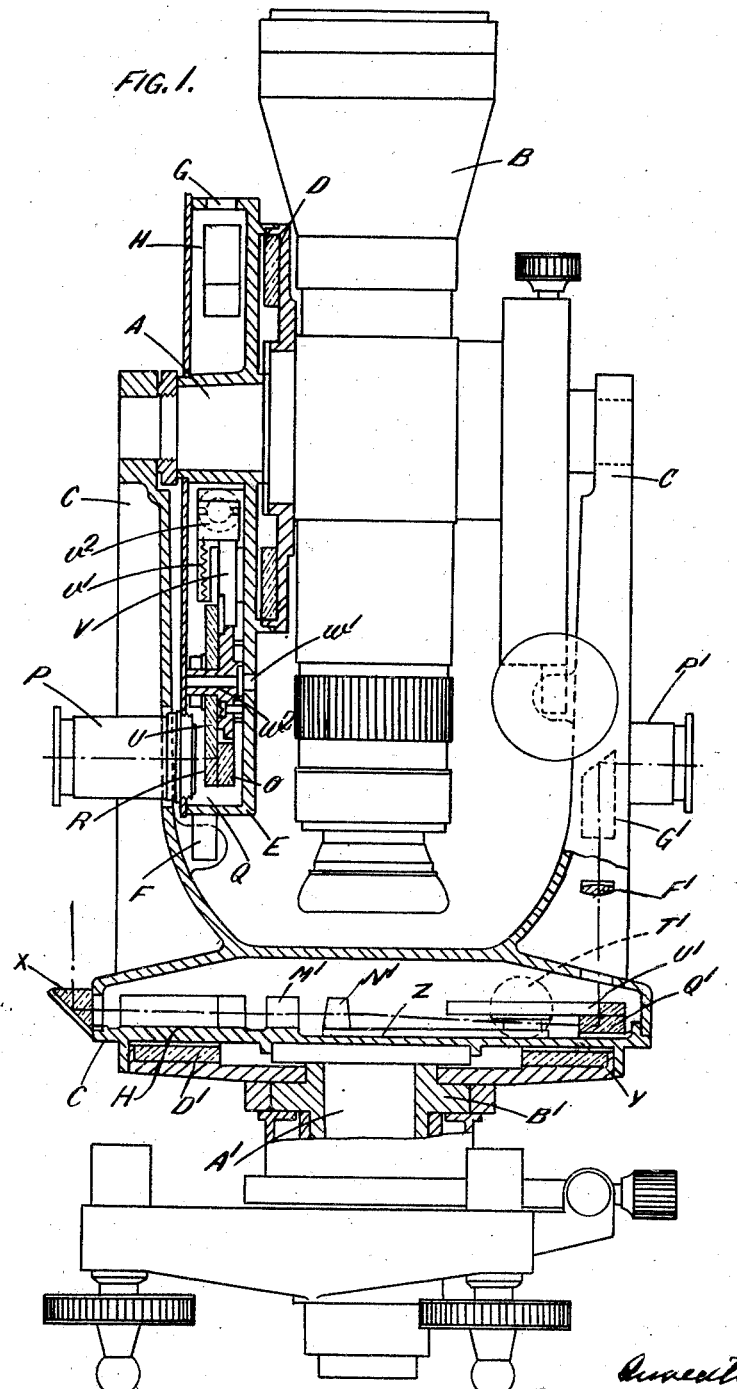

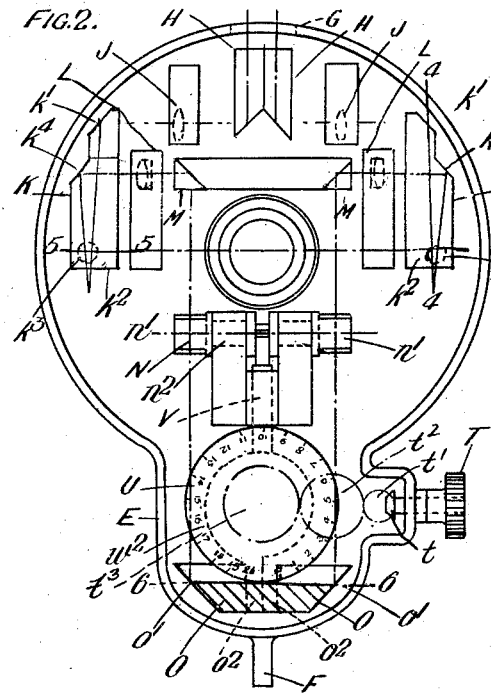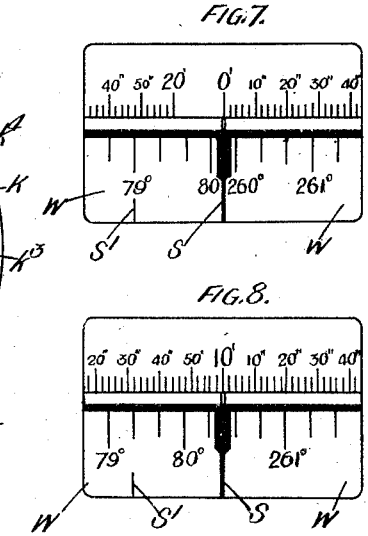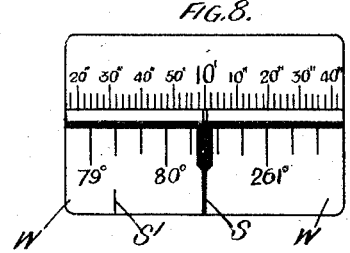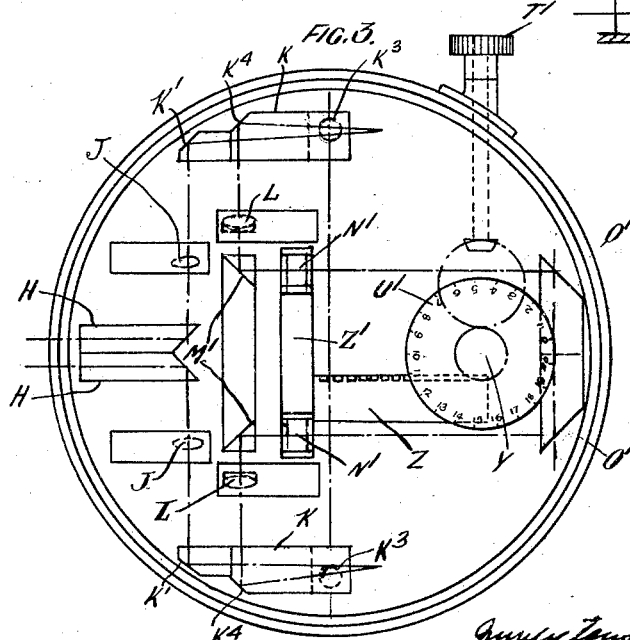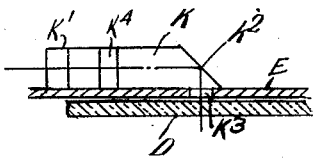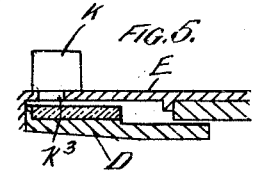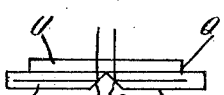

Patented Apr. 15, 1930

1,754,872

UNITED STATES PATENT OFFICE

THOMAS YEOMANS BAKER AND RALPH WALDO CHESHIRE, OF TEDDINGTON, ENGLAND, ASSIGNORS TO COOKE, TROUGHTON & SIMMS LIMITED, OF YORK, ENGLAND, A BRITISH COMPANY

THEODOLITE AND OTHER ANGLE MEASURING INSTRUMENTS

Application filed February 16, 1928, Serial No. 254,868, and in Great Britain February 26, 1927.

This invention relates to theodolites and other angle measuring instruments. In making measurements of angles by means of such instruments in which the angles are read from a graduated scale (herein termed the circle) accuracy can only be attained if the circle is read at more than one point. In general, modern dividing engines by means of which the divisions are cut are so exact that the graduation marks may be considered to radiate from a common point (when the divisions are cut upon a flat surface) and to be uniformly spaced but it is usually impossible to ensure that the circle is attached to the instrument so that the centre of graduation of the circle (i. e. the above-mentioned common point) corresponds exactly with the mechanical centre of the instrument (i. e. the centre about which the telescope or the like is turned). Provided only errors of centering have to be dealt with their effect can be neutralized by reading the circle at two points which are the opposite ends of a diameter of the circle and in the simplest form the provision of two datum marks and means for measuring the angular distance of each datum mark from the nearest graduation on the circle provide all that is really needed since by taking these two readings, and then adding or subtracting 90° to the arithmetic mean of these two values there will be obtained the true reading on the circle for a line which is parallel to the line joining the two datum marks but passes through the centre of graduation of the circle. In practice such a method has disadvantages. The most serious are that it takes considerable time to effect a measurement and that it is necessary to walk round the instrument in order to take the two readings.

In the type of theodolite to which our invention relates, the scale divisions or graduations at two different points of the circle are viewed by a single eyepiece into the field of view of which the said graduations are optically projected into juxtaposition. In a theodolite or other angle measuring instrument made according to our invention the graduations at one point of the circle are projected into one part of the field of view—the left, say—whilst the graduations at the other point of the circle are projected into the other part of the field of view with a datum mark situated between the adjacent ends of the scale images thus obtained, and a fine reading device is provided for displacing the scale images simultaneously with respect to the said datum mark and in the same direction as seen in the field of view, the coarse reading being obtained from one or the other of the scale images with the said datum mark as the reference point or with an other indicating mark in the field of view as the reference point. The scale images preferably abut at the centre of the field against the datum mark and are thus seen as a continuous scale stretching across the field of view at right angles to the datum mark. The latter occupies a definite position in relation to each scale image and if light could be thrown backwards from the datum mark through the various prisms and lenses constituting the optical arrangement of the instrument, two images of the datum mark would be formed upon the surface of the circle. The line joining these two images of the datum mark would not in general pass through the centre of graduation, but would pass eccentrically to the side of it owing to the impossibility of manufacturing an instrument in which the centre of graduation corresponds exactly with the mechanical centre. Approximately, however the line joining these two datum marks is a diameter of the circle when the circle is viewed at diametrically opposite points and if a parallel line be substituted for it which does not pass with absolute exactness through the centre of graduation there is then defined in this manner what will be referred to as the "reading diameter". This reading diameter may by accident lie exactly on two graduations of the circle which differ by 180° from one another. More generally it will not do so in which case the exact reading necessitates the determination by some means of the sub-division of the space between two graduations within which the end of the reading diameter falls. The true reading for the end of the reading diameter is greater than the reading for the graduation on the one side of it and less than the reading for the graduation on the other side. The excess over the lower of these two graduations is referred to as the "fine reading".

Provided the instrument is free from centering error and the magnifications of the two scale images are equal, the graduations of the two images will progress at equal rates during the turning of the instrument and the distance of a specified graduation in the one scale image from a specified graduation in the other scale image will remain constant as the graduations travel over the focal plane when the instrument is turned. If, however, the instrument contains centering error the relative distance of specified graduations will not remain constant and the alteration of distance can be appreciated by realizing what will happen if the instrument is displaced without rotation in a direction at right angles to the reading diameter. The optical images of the datum mark upon the divided circle will under such circumstances move, one going to a lower reading and the other to a higher one, and by equal amounts. The corresponding movement of the scale images is therefore for one image from left to right and for the other image from right to left and by equal amounts.

The datum mark at any moment will lie between the end graduation of the one scale image and the end graduation of the other scale image. The space between these two end graduations remains constant as the instrument is turned provided there is no centering error. The space will also remain constant in width under the same conditions if instead of turning the instrument, movable optical elements (whether fine angled refracting prisms, parallel plate micrometers or the like) that are employed for measurement of the fine reading be actuated. Further if the instrument were entirely free from centering error the space between the two end graduations that are visible on either side of the datum mark would be of the same breadth for all positions of the instrument. If there is centering error this space will not be constant but will vary between an upper and a lower limit whose values depend upon the amount of eccentricity between the centre of graduation and the mechanical centre. In all cases, however, whether there be centering error or not the true reading of the circle can be obtained by actuating the fine reading device until the two graduations, one in each scale image, that lie immediately next to the datum mark appear to the observer to be equidistant from the datum mark so that the latter exactly bisects the space between the two end graduations. The true reading of the reading diameter will then be the value of the reading of the end graduation plus the amount of fine reading, or alternatively will be the value of the reading of some graduation at a more convenient part of the field, the said graduation being indicated by some indicating mark which points approximately towards it. The optical arrangements are preferably such that the amount of the fine reading can be determined from a scale that appears visible in another part of the field of view of the same eyepiece through which the datum mark and the scale images are viewed, but if desired the fine reading scale may be read by a different eyepiece at another part of the instrument.

In order that the said invention may be clearly understood and readily carried into effect, the same will now be described more fully with reference to the accompanying drawings, in which:—

Figure 1 is a section of a theodolite in which the readings of both circles are obtained according to the present invention, Figure 2 is a vertical section of the optical arrangement by which the readings of the vertical circle are obtained, Figure 3 is a horizontal section of the optical arrangement by which the readings of the horizontal circle are obtained.

Figure 4 is a section on the line 4, 4 of Figure 2,

Figure 5 is a section on the line 5, 5 of Figure 2.

Figure 6 is a section on the line 6, 6 of Figure 2,

Figures 7 and 8 are views showing what is seen through one of the eyepieces of the theodolite.

Figure 9 is a view similar to Figure 3 showing certain parts in greater detail.

Figure 10 is a section on the line 10, 10 of Figure 9.

Figure 11 is a view of the horizontal circle (the vertical circle being similarly graduated).

Figure 12 is an enlarged view of the graduations of Figure 11, and

Figure 13 is a view showing the reading marks appertaining to the fine reading device of the vertical circle.

Referring to Figure 1, the horizontal axis pin A to which the telescope B is attached is rotatably mounted in standards C and carries with it a glass circle D. A casing E also bears on the horizontal axis pin A but is prevented from rotating with the telescope and the circle by a key F. Light enters the casing E by an aperture G and is reflected in opposite directions by prisms H, H in the plane of the paper in Figure 2 after which it passes through condenser lenses J, J and prisms K, K in which latter four reflections take place. The first reflection takes place at the surface $k'$, $k'$ where the light is bent through less than one right angle in the plane of the paper in Figure 2, say 87½°, the second reflection takes place at the surface $k^2$, $k^2$, Figure 4, where the light is bent downwards at right angles through two apertures $k^3$, $k^3$ in the casing E and reaches the furthermost surface of the glass circle D, Figure 4, at a slight inclination to the plane of Figure 4 as indicated in Figure 5; this inclination is necessarily maintained by the reflected ray before it is once more reflected back into the plane of the paper in Figure 2 by the surfaces $k^2$, $k^2$ and emerges after reflection at the surfaces $k^4$, $k^4$, parallel to its original direction before entering the prisms K, K.

The purpose of the lenses J, J is to concentrate the light received through the aperture G on to the two portions of the glass circle D immediately beneath the apertures $k^3$, $k^3$ and this light after emergence from the prisms K, K is received by the objectives L, L whose function it is to image that portion of the glass circle D lying immediately beneath the apertures $k^3$, $k^3$ in the casing E.

The apertures $k^3$, $k^3$ lie symmetrically on a diameter of the glass circle D on which an angular scale is etched or otherwise produced on the side remote from E, this side being finally silvered to ensure the reflection of the illuminating rays so that the graduations as viewed by the objectives L, L appear dark against an illuminated background as if viewed by transmitted light.

After passing through the objectives L, L the image forming rays are received by prisms M, M and bent at right angles in the plane of Figure 2 after which they pass through parallel glass plates N, N forming part of the fine reading device and are received by prisms O, O which first bend the image forming rays inwards towards each other at the surfaces $o'$, $o'$ and then upwards at the surfaces $o^2$, $o^2$ at right angles to the plane of Figure 2 and as indicated in Figure 6, into the eyepiece P, Figure 1.

The prisms O, O meet along a common line and the common focal plane of the two objectives L, L is situated on the surface Q. A parallel piece of glass R, Figure 1, is cemented to the prisms O, O and has reading marks S, S' (Figure 13), on its lower side, that is in the common focal plane of the two scale images.

The two glass plates N, N can be turned about an axis $n'$, $n'$ by rotation of a knurled head T which through intermediate gearing causes rotation of a glass disc U about an axis pin $w'$. This intermediate gearing comprises bevel pinions $t$, $t'$ and spur pinions $t^2$, $t^3$ the latter being connected to the disc U. Attached to the glass disc is a cam $w^2$, against which a plunger V is held by a spring $v'$. The plunger V terminates in a crosshead $v^2$, in which are two slots engaging eccentric pins attached to spindles $n^2$, $n^2$ and so arranged that these spindles and the glass plates N, N to which they are attached are caused to rotate about the axis $n'$, $n'$, by a longitudinal movement of the plunger V. The pins $n^2$, $n^2$ are arranged above and below the plane of Figure 2, so that as the crosshead $v^2$ is moved longitudinally by rotation of the cam $w^2$, the two glass plates N, N move angularly in opposite directions. The purpose of the cam $w^2$ is to so control the movements of the glass plates N, N that rotation of the glass disc U always brings about an equal and proportional displacement in the same direction, of the scale images W, W in the field of view of the eyepiece P.

The surface of the glass disc U lying in the focal plane Q of the objectives L, L is divided and etched and as its thickness corresponds to that of the glass plate R and light is transmitted through it after reflection at the surfaces $o^2$, $o^2$ it follows that the eyepiece P will be able to focus the two scale images and the division of the fine reading disc U simultaneously. In some cases it may be more convenient to employ a straight transparent scale instead of a circular one.

The vertical axis pin A' (Figure 1) carries the casing C which moves relatively to the horizontal glass circle D' which is carried independently by a second vertical axis pin B' as is usual in the construction of theodolites; in this case the circle remains relatively stationary and the prism system and eyepiece rotate with the telescope on a vertical axis. The optical arrangement by which the horizontal circle D' is read is shown as being similar to that already described with regard to the vertical circle D as will be seen from Figures 1 and 3, in which similar reference letters have been used for the parts which correspond to those appertaining to the vertical circle, but different means have been shown for deflecting the two scale images and only those parts which differ will now be described. Light is reflected into the casing C by means of a prism X (mounted to be angularly adjustable about a horizontal axis so as to enable unobstructed light from the sky to be received) and after a path similar to that already described the image forming rays for each diametrically opposed part of the glass circle pass through deflecting prisms N', N' which may be simple or achromatic and which are arranged so that the rays are deflected in the one case above and in the other below the plane of Figure 3. On rotation of a knurled head T', Figure 3, a divided glass disc U' is rotated through intermediate gearing comprising bevel pinions $t^4$, $t^5$ and a pinion Y connected to the glass disc U'. This pinion operates through a rack Z to cause the deflecting prisms N', N' in their mount Z' (which is connected to the rack) to move between the prisms M', M' and the prisms O', O' similar to the aforesaid prisms O, O; as the deflection of the image in the focal plane is strictly proportional to the movement of the prisms N', N' and therefore to the angular rotation of the divided glass disc U', no cam is in this case necessary. The connection between the rack Z and the mount Z' is shown in Figures 9 and 10, these Figures also showing guides Z² in which the ends of the mount Z' slide. It will be understood that reading marks similar to those of Figure 13 are associated with the prisms O', O'.

It is obvious that the scale images and fine reading disc may be re-imaged and transferred to some other part of the instrument, and this is indicated in Figure 1 where the scale images and the fine reading disc in the focal plane Q' are transferred to the focal plane of an eyepiece P' by means of an objective F' and a prism G'. Furthermore the scale images of both circles D and D' and of both fine reading discs U and U' may be brought into a common eyepiece. It may also be found convenient to so arrange the parts that the rotation of a single knurled head operates simultaneously both the tilting plates N, N of the vertical circle D and the travelling deflecting prisms N', N' of the horizontal circle D' and their respective fine reading discs U and U'.

It will be seen that the optical arrangements are such that the scale images at opposite ends of the diameter of each circle appear as shown in Figures 7 and 8 with the datum mark S between them, the numbers of the graduations in one image increasing when going towards the datum mark whilst those in the other image increase when going away from the datum mark. Figure 7 shows the condition in which the reading is exactly 80°, there having been no necessity to operate the fine reading device, and Figure 8 shows the condition in which it has been necessary to operate the fine reading device to displace the 80° 20' graduation of the left hand scale image and the 260° 20' graduation of the right hand scale image simultaneously so as to cause these graduations to occupy positions with the datum mark midway between them, the reading of the fine reading device being 10' making the total reading 80° 30'. As shown the graduations of the scale images are parallel to the datum mark which has parallel sides, but if desired the datum mark may be wedge-shaped in which case the graduations in one scale image would be parallel to one inclined side of the datum mark and the graduations in the other scale image would be parallel to the other inclined side of the datum mark. Also although the bases of the graduations in the two scale images are shown as being in line with each other they may be displaced some distance from each other and parallel with the datum mark between the adjacent ends of the graduations. Furthermore although the coarse reading has been described as having been obtained from the scale images with the datum mark S as the reference point, any other indicating mark in the field of view may, if desired, be used as the reference point. For example a fixed mark S' may be provided as shown in Figures 7 and 8 for the coarse reading of the left hand scale image, the reading in Figure 7 being 79° with no fine reading adjustment; in Figure 8 the coarse reading is 79° 20' and the fine reading is 10', making a total of 79° 30'.

It has been assumed that the graduation marks of the circles D and D' are numbered consecutively all around for every degree from 1° to 360°, (see Figures 11 and 12) that these numbers run clockwise round the circle and that the degree divisions are subdivided into 20 minute divisons, but it is to be understood that the division of the circle in any other manner, provided it is uniform, is contemplated as being suitable for use with this invention, and that the subdivision may be made in any convenient units. It is to be understood also that the circles may be numbered anti-clockwise, or may be numbered clockwise for one half of the circle and anti-clockwise for the other half; or may be numbered both clockwise and anti-clockwise by two different sets of numbers. The invention is also intended to include various types of graduated circles; i. e. the graduations may be cut radially from a centre upon a plane surface, parallel to one another upon a plane surface, parallel to one another upon a cylindrical surface, upon a conical surface, or upon any other surface of revolution.

Whilst the horizontal divided circle D' has been described as being fixed and the body of the instrument carrying the lenses, reflecting prisms and other devices, including the datum mark, as being capable of turning round a mechanical vertical axis, it is to be understood that this limitation is made solely for the purposes of description and that the invention relates to all methods of reading a divided circle whether the circle remains fixed and the body of the instrument moves as stated above, or whether the body remains fixed and the circle moves or whether both move with relative motion to one another; further it relates to all cases whether the circle is horizontal or vertical or inclined in any position to the vertical or horizontal.

What we claim and desire to secure by Letters Patent of the United States is:—

1. A theodolite or other angle measuring instrument having in combination a graduated circle, an eyepiece, a datum mark, means for optically projecting the scale divisions or graduations at one point of said circle into one part of the field of view of said eyepiece and those at another point of said circle into another part of the field of view with the datum mark situated between the adjacent ends of the scale images thus obtained and a fine reading device for displacing said scale images simultaneously with respect to the datum mark and in the same direction as seen in the field of view.

2. A theodolite or other angle measuring instrument having in combination a graduated circle, an eyepiece, a datum mark, means for optically projecting the scale divisions or graduations at one point of said circle into one part of the field of view of said eyepiece, and those at another point of said circle into another part of the field of view with the datum mark situated between the adjacent ends of the scale images thus obtained and with the numbers of the graduations in one scale image increasing when going towards the datum mark and the numbers of the graduations in the other scale image increasing when going away from said datum mark, and a fine reading device for displacing said scale images simultaneously with respect to the datum mark and in the same direction as seen in the field of view.

3. In a theodolite or other angle measuring instrument, the combination with the elements claimed in claim 1, of a scale apertaining to the fine reading device and means for rendering said scale visible in another part of the field of view of the eyepiece through which the scale images of the circle are seen.

4. In a theodolite or other angle measuring instrument, the combination with the elements claimed in claim 1, of a compound prism for the illumination and imaging of the circle, said prism being disposed forwardly of the circle and in a parallel plane therewith, the prism having a reflecting surface to transmit illuminating rays parallel to the plane of the circle, a second reflecting surface to transmit such rays onto the circle, said last mentioned surface reflecting the image of the circle in the plane of the circle, and a third reflecting surface for reflecting said imaging rays parallel to the illuminating rays, but non-coincident therewith.

5. A theodolite or other angle measuring instrument having in combination a graduated circle, an eyepiece, a datum mark, means for optically projecting the scale divisions or graduations at one point of said circle into one part of the field of view of said eyepiece and those at another point of said circle into another part of the field of view with the datum mark situated between the adjacent ends of the scale images thus obtained, and a fine reading device for displacing said scale images simultaneously with respect to the datum mark and in the same direction as seen in the field of view, said fine reading device being illuminated from the same source as the datum mark and scale images.

THOMAS YEOMANS BAKER.
RALPH WALDO CHESHIRE.